July 23, 1946.  R. K. HALLUM  2,404,495
HANDLE
Filed March 24, 1945
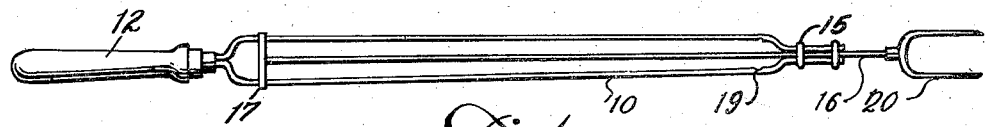
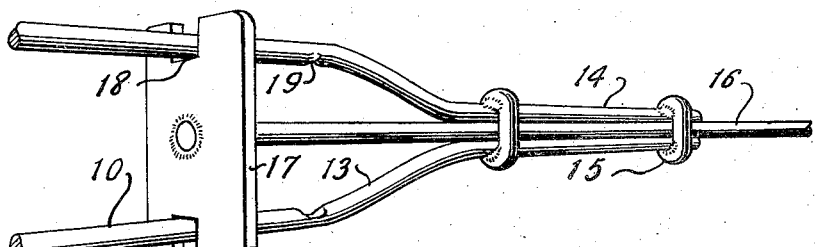
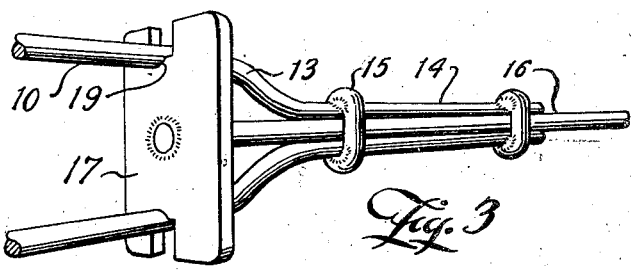
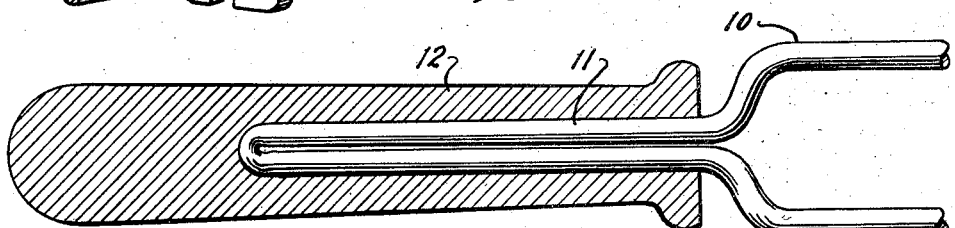
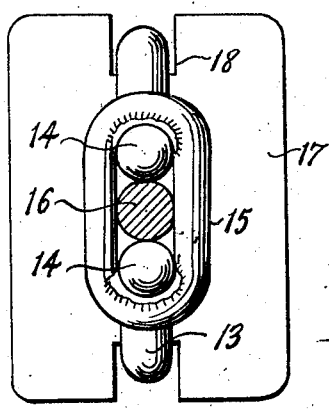
Inventor
Robert K. Hallum Patented July 23, 1946

2,404,495

UNITED STATES PATENT OFFICE 2,404,495

HANDLE

Robert K. Hallum, Brownwood, Tex.

Application March 24, 1945, Serial No. 584,710

4 Claims. (Cl. 30—322)

This invention relates to new and useful improvement in handles.

One object of the invention is to provide an improved handle of the extension type which will be more sturdy when extended.

A further object of the invention is to provide an improved handle having an extensible or slidable implement or tool member and a guide for said member with releasable means for securing the slidable member in extended position, whereby said member is not only more firmly held in its extended position but will resist retraction when the handle is moved or pushed forwardly to engage the implement or tool with an article, mass or commodity.

Still another object of the invention is to provide an improved handle having an extensible shank attached at one end to a crosshead which is slidable in a yieldable frame having notches adjacent its outer end and reduced in width toward its outer end, whereby said head may be engaged in the notches when slid outwardly or forwardly to extend the shank and the shank thus securely held in position and also whereby, the frame may be readily sprung to release the crosshead when it is desired to retract the shank.

A construction designed to carry out the invention will be hereinafter described together with other features of the invention.

The invention will be more readily understood from a reading of the following specification and by reference to the accompanying drawing, wherein an example of the invention is shown, and wherein:

Figure 1 is a plan view of a handle made in accordance with the invention attached to a fork and in its retracted position.

Figure 2 is an enlarged perspective view of an intermediate portion of the handle with the crosshead adjacent the frame notches, Figure 3 is a similar view with the crosshead engaged in the notches, Figure 4 is a longitudinal sectional view of a hand grip having a portion of the frame secured therein, and Figure 5 is an enlarged cross-sectional view adjacent the crosshead with the parts in the positions shown in Figure 3.

In the drawing, the numeral 10 designates an elongate frame or loop which is preferably formed of relatively heavy spring wire. The wire is bent upon itself at one end to form a return bend 11 which is sufficiently long to be inserted axially in a hand grip 12. The wire members which form the sides of the frame converge toward the opposite or forward end of the frame, whereby the width of the frame is gradually reduced toward said forward end. The forward ends of the wire members are bent inwardly or toward each other at 13, thus forming the forward end of the frame. These wire members are again bent to form forwardly directed arms or fingers 14 which pass through spaced elongate loops or rings 15, one of which is adjacent the bends 13 and the other of which is adjacent the forward ends of said arms. These rings may be fastened on the arms by soldering or welding.

An extensible shank 16 in the form a right line rod or heavy wire has a snug sliding fit between the arms 14, which arms are long enough to support and guide the shank. The rear end of the shank is fastened in the center of a transverse metal plate 17 disposed in the frame and forming a crosshead. Each end of the plate is provided with central recesses or slots 18 which receive the side members of the frame, whereby the frame guides and retains the plate as the latter is slid longitudinally thereof. These recesses are deep enough to retain the plate in the frame when it is moved to the rear end of said frame.

It is obvious that by holding the hand grip 12 in one hand and grasping the plate 17 between thumb and fingers of the other hand, the operator may slide the plate 17 in the frame and thereby extend or retract the shank 16. At or adjacent the bend 13 the side members of the frame are provided with inwardly and oppositely facing notches 19. When the plate 17 is slid forwardly to fully extend the shank, the bottom edges of the recesses 18 engage in the notches 19.

Owing to the reducing width of the frame and the resiliency of its side members, the plate slightly spreads these side members as it approaches and engages in said notches. The plate is thus resiliently held in the notches between the yieldable side members of the frame at the forward end thereof. While any suitable implement or tool may be carried by the forward end of the shank 16, I have shown an ordinary cooking fork 20 secured thereon.

It is pointed out that by reason of the latching of the plate 17 in the notches 19, the fork 20 is held firmly in position so that when it is stuck into a ham or a roast of beef, the shank 16 and frame 10 do not yield, but remain in their adjusted positions. The rings 15 and arms 14 form a sturdy support for the shank and the entire handle is simple and stout. By reducing the frame in width toward its forward end, the plate is substantially wedged in place when it engages in the notches. By slightly spreading the side members of the frame adjacent the notches, the plate may be readily released for retracting the shank.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A handle including, an elongate frame having a forward and a read end, a hand grip secured to the rear end of the frame, a pair of guide arms extending from the forward end of the frame, a transverse plate slidable in the frame, a pair of spaced rings surrounding the arms, and an elongate shank having one end secured to the plate, said shank being slidable between the arms and extending therefrom, the frame having notches adjacent its forward end for receiving the plate to latch the shank in extended position.

2. A handle including, an elongate wire frame, a hand grip secured to one end of the frame, a guide at the forward end of the frame, a transverse plate having recesses receiving the side members of the frame and slidable longitudinally of the frame, and a right line shank having one end secured to the plate and extending through the guide, the frame having notches adjacent its forward end for receiving the plate to latch the plate and shank in extended position.

3. A handle including, an elongate frame formed of a single looped wire bent upon itself at the rear end of the frame to receive a hand grip and bent inwardly at the forward end of the frame, the forward ends of the wire being directed forwardly to form parallel guides, rings surrounding the guides, a transverse plate slidable in the frame having recesses receiving the side wires of the frame, and a right line wire shank secured at one end to the plate and slidable between the guides, the frame wire having notches adjacent the bends at its forward end to receive the plate.

4. A handle including, an elongate resilient frame having means at its rear end for securing a hand grip thereto and reduced in width toward its forward end, a guide at the forward end of the frame, the forward end of the frame having inwardly facing notches, a transverse plate slidable longitudinally in the frame engageable in the notches thereof, and an elongate shank attached to the plate and slidable in the guide.

ROBERT K. HALLUM.